Sept. 18, 1951      E. H. GRIFFITH      2,567,998
DEVICE FOR TREATING OIL FOR THE SEPARATION OF WATER
Filed April 23, 1951
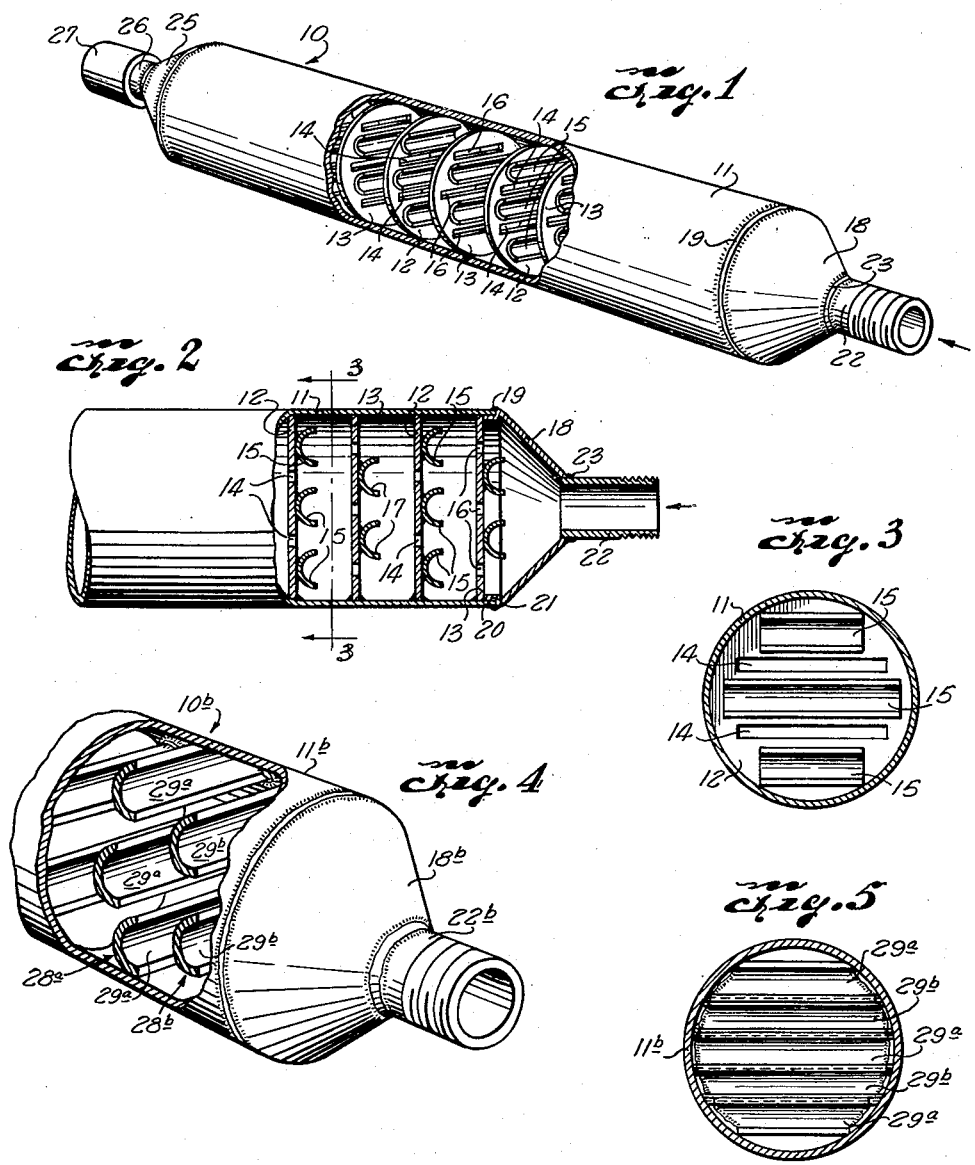
Ernest H. Griffith
INVENTOR.
ATTORNEY Patented Sept. 18, 1951

2,567,998

UNITED STATES PATENT OFFICE 2,567,998

DEVICE FOR TREATING OIL FOR THE SEPARATION OF WATER

Ernest H. Griffith, Jal, N. Mex., assignor, by direct and mesne assignments, to Marvel Oil Treater, Inc., a corporation of Delaware Application April 23, 1951, Serial No. 222,340

4 Claims. (Cl. 138—37)

This invention relates to fluid agitating devices and more particularly to an agitating device for thoroughly mixing fluids in their passage therethrough.

Crude oil flowing from oil wells is often mixed with water. This water must be separated from the oil before the oil is transported from the site of the well. Various chemical agents may be added to the crude oil to speed up and make more complete the separation of the water from the oil in separation tanks into which the crude oil is delivered for the separation. These chemicals must be thoroughly mixed with the crude oil in order to have maximum effect. It is desirable therefore that an agitating device be provided through which the mixture of crude oil and chemicals can pass on its way to the separation tank which will agitate the mixture thoroughly thus effecting a very thorough mixing of the chemical with the crude oil.

An object of this invention is to provide an agitating device through which a fluid may pass and be thoroughly agitated in the passage.

Another object of this invention is to provide an agitating device of sturdy simple construction.

Still another object of the invention is to provide an agitating device in which a fluid mixture may be agitated to effect a thorough mixing of the elements of the mixture.

The agitating device of the invention comprises a cylindrical shell in which are mounted a plurality of spaced disks. Each of the disks has a plurality of elongate apertures, the apertures of each disk being staggered with relation to the apertures in adjacent disk. Each disk has a plurality of elongate semi-cylindrical members which extend parallel to and between the elongate apertures. The concave sides of the semi-cylindrical members face the direction from which the fluid enters the passes through the cylindrical shell and the semi-cylindrical members of each disk are aligned with the apertures in the disk immediately preceding it. This disposition of the semi-cylindrical members causes the fluid flowing through the apertures in a disk to impinge on the concave surfaces of the semi-cylindrical members of the next disk from whence the fluid is deflected back toward the first disk. The resultant turbulence so produced agitates the fluid and mixes it thoroughly.

In the drawing which illustrates the invention,

Figure 1 is a perspective view of the agitating device with a portion of the cylindrical shell broken away to show the internal arrangement of the disks;

Fig. 2 is a fragmentary side view of the device of Figure 1 with a portion shown in longitudinal section;

Figure 3 is a transverse sectional view taken on line 3—3 of Figure 2;

Figure 4 is a fragmentary perspective view, with a portion broken away, of a modified form of the device shown in Figure 1; and Figure 5 is a transverse sectional view of the device shown in Figure 4.

Referring now especially to Figures 1 to 3 of the drawing, the agitating device 10 includes a cylindrical shell 11 in which are rigidly secured in alternate order spaced tranverse disks 12 and 13. The disks 12 and 13 may be secured to the cylindrical shell 11 by welding. Each of the disks 12 have two elongate apertures 14 and three elongate semi-cylindrical members 15 which extend parallel to the elongate apertures 15. The disks 13 are provided with similar elongate apertures 16 and similar semi-cylindrical members 17. It will be observed that the semi-cylindrical members 15 of each disk 12 is aligned with the elongate apertures 16 of the disk 13 which is disposed immediately forward of each disk 12. Similarly, the semi-cylindrical members 17 of each disk 13 are aligned with the apertures 14 of the disk 12 disposed immediately forward of each disk 13. As the fluid passes through the cylindrical shell in the direction indicated by the arrows in Figures 1 and 2, it must flow through the elongate apertures in the disks 12 and 13. After it passes through the apertures 14 of any disk 12, it strikes or impinges on the concave surfaces of the semi-cylindrical members 17 of the disk 13 disposed immediately behind the disk 12. The concave surfaces will tend to deflect the fluid back toward the disk 12 through whose apertures the fluid has just passed. This deflecting action will cause considerable turbulence between every pair of adjacent disks thereby insuring that the fluid will be well mixed in passing through the cylindrical shell 11.

The forward end of the cylindrical shell has a conical member 18 rigidly secured to it by welding at as 19. The end of the conical member 19 is turned inward to form an abutment 20 against which the forward edge of the shell abuts and an annular flange 21 which telescopes in the forward end of the cylindrical shell 11. An externally threaded pipe 22 extends into the central opening in the narrow end of the conical member 18 and is secured thereto by welding as at 23. The threaded end of the pipe 22 may be connected into an internally threaded fitting of a pipe (not shown) through which fluid is delivered to the agitating device.

The rear end of the cylindrical shell 11 is provided with a similar conical member 25 which is secured to the cylindrical shell 11 is in the same manner as the front conical member 18. A pipe 26 is rigidly secured to the rear conical member 25 in the same manner as the pipe 22 is secured to the front conical member 18. The pipe 26 has an internally threaded extension 27 which engage the externally threaded end of a pipe (not shown) through which fluid may pass from the agitating device 10. The agitating device 10 can thus be easily connected in a pipe line between an oil well and the separation tank. The chemical which facilitates separation of water from oil will, of course, be introduced into the pipe line at a point in advance of the agitating device 10.

In Figures 4 and 5 is illustrated a modified form of the agitating device in which the disks 12 and 13 are not present. A plurality of rows 28 of spaced semi-cylindrical members 29 are disposed in the shell 11b of the agitating device 10b. The semi-cylindrical members 29a of one row 28a are disposed in staggered relation to the semi-cylindrical members 28b of the adjacent rows 28b so that fluid passing in the space between two adjacent semi-cylindrical members of one row will stike or impinge on the concave forward surface of a semi-cylindrical member of the next row 28. The deflecting action of the concave surface will again cause the fluid to be agitated very strongly.

An agitating device has been shown which is strong and simple in construction which employs the concave surfaces of semi-cylindrical members, interposed in the path of movement of fluid within an elongated shell, to deflect the fluid back in the direction from which it is arriving. A turbulence is thus produced which mixes the fluid very thoroughly.

It will be understood that it is intended to cover all changes and modifications of the example of the invention herein chosen for the purpose of illustration which do not constitute departures from the spirit and scope of the invention.

What is claimed is:

1. An agitating device comprising an elongate shell; a plurality of spaced transverse disks rigidly secured in said shell and dividing said shell into a plurality of compartments, each of said disks having a plurality of elongate parallel apertures; and a plurality of spaced transverse semi-cylindrical members on each disk, the convex side of each member being tangent to its associated disc and secured thereto between adjacent apertures and the semi-cylindrical members of each disk being aligned with the apertures of the immediately preceding disk, said semi-cylindrical members having their concave surfaces facing the aligned apertures of the immediately preceding disk.

2. An agitating device comprising a cylindrical shell; a plurality of longitudinally spaced transverse disks rigidly secured in said shell, each of said disks having a plurality of elongated parallel apertures, the apertures of each disk being disposed in staggered relation to the apertures in adjacent disks; and a plurality of spaced parallel transverse semi-cylindrical members on each disk, the convex side of each member being tangent to its associated disc and secured thereto between adjacent apertures and the semi-cylindrical members of each disk being aligned with the apertures of the immediately preceding disk, said semi-cylindrical members having their concave surfaces facing the aligned apertures of the immediately preceding disk.

3. An agitating device comprising an elongate shell; a plurality of spaced transverse disks rigidly secured in said shell and dividing said shell into a plurality of compartments, each of said disks having a plurality of elongate parallel apertures; and a plurality of spaced transverse semi-cylindrical members on each disk, the convex side of each member being tangent to its associated disk and secured thereto between adjacent apertures and the semi-cylindrical members of each disk being aligned with the apertures of the immediately preceding disk, said semi-cylindrical members having their concave surfaces facing the aligned apertures of the immediately preceding disk and the spacing between adjacent semi-cylindrical members on each disk beign greater than the width of the aperture therebetween.

4. An agitating device comprising a cylindrical shell; a plurality of longitudinally spaced transverse disks rigidly secured in said shell, each of said disks having a plurality of elongated parallel apertures, the apertures of each disk being disposed in staggered relation to the apertures in adjacent disks; and a plurality of spaced parallel transverse semi-cylindrical members on each disk, the convex side of each member being tangent to its associated disk and secured thereto between adjacent apertures and the semi-cylindrical members of each disk being aligned with the apertures of the immediately preceding disk, said semi-cylindrical members having their concave surfaces facing the aligned apertures of the immediately preceding disk and the spacing between adjacent semi-cylindrical members on each disk being greater than the width of the aperture therebetween.

ERNEST H. GRIFFITH.

REFERENCES CITED

The following references are of record in the file of this patent:

UNITED STATES PATENTS

| Number | Name | Date |
| --- | --- | --- |
| 2,069,714 | Getchell | Feb. 2, 1937 |
| 2,125,245 | McCray | July 26, 1938 |
| 2,194,946 | Kunstorff | Mar. 26, 1940 |